United States Patent [19]

Anderson et al.

[11] Patent Number: 4,998,961
[45] Date of Patent: Mar. 12, 1991

[54] TWINE MONITORING ASSEMBLY FOR ROUND BALERS

[75] Inventors: J. Dale Anderson, Canton; Lavern R. Goossen, Newton, both of Kans.

[73] Assignee: Hay & Forage Industries, Hesston, Kans.

[21] Appl. No.: 492,286

[22] Filed: Feb. 28, 1990

Related U.S. Application Data

[63] Continuation of Ser. No. 384,847, Jul. 17, 1989, abandoned, which is a continuation of Ser. No. 102,026, Sep. 29, 1987, abandoned.

[51] Int. Cl.$^5$ .......................................... B67B 57/10
[52] U.S. Cl. ......................................... 100/4; 53/118; 53/508; 56/343; 56/341; 100/13; 100/88; 100/99; 100/5
[58] Field of Search ....................... 100/2-5, 100/8, 13, 15, 40, 88, 89, 99; 53/118, 508, 587; 56/341, 342, 343; 414/24.5, 43, 44; 226/45, 100; 242/84.1 M; 116/202; 340/670, 677; 200/61.18, 61.13, 61.14, 61.17

[56] References Cited

U.S. PATENT DOCUMENTS

| | | | |
|---|---|---|---|
| 3,739,276 | 6/1973 | Dornberger | 340/670 |
| 4,024,804 | 5/1977 | Hanson | 56/341 |
| 4,378,652 | 4/1983 | Lindgren | 242/84.1 M |
| 4,438,391 | 3/1984 | Rog et al. | 242/84.1 M |
| 4,647,243 | 3/1987 | Koning | 100/88 |
| 4,656,931 | 4/1987 | Van Den Bossche et al. | 100/4 |
| 4,697,402 | 10/1987 | Anstey et al. | 53/508 |
| 4,699,031 | 10/1987 | D'Angelo et al. | 226/155 |

FOREIGN PATENT DOCUMENTS 2153293 8/1985 United Kingdom .

Primary Examiner—Harvey C. Hornsby
Assistant Examiner—Stephen F. Gerrity
Attorney, Agent, or Firm—Hovey, Williams, Timmons & Collins

[57] ABSTRACT

The baler has a twine monitoring assembly which generates a pulsating signal in response to twine being dispensed during bale wrapping operations. The twine is wrapped around the periphery of a monitor wheel and, during dispensing, the twine rotationally drives the wheel. As the wheel rotates, a magnet affixed to the wheel at a location adjacent the periphery thereof, travels past a stationary, magnetically operated, normally open switch thereby briefly closing the switch and temporarily turning on an indicator light until the magnet moves sufficiently far enough away from the switch. During wrapping of the bale, twine is rapidly dispensed, causing the wheel to rapidly rotate and as a consequence, causing the light to pulsate, indicating to the operator that twine is being dispensed.

9 Claims, 1 Drawing Sheet

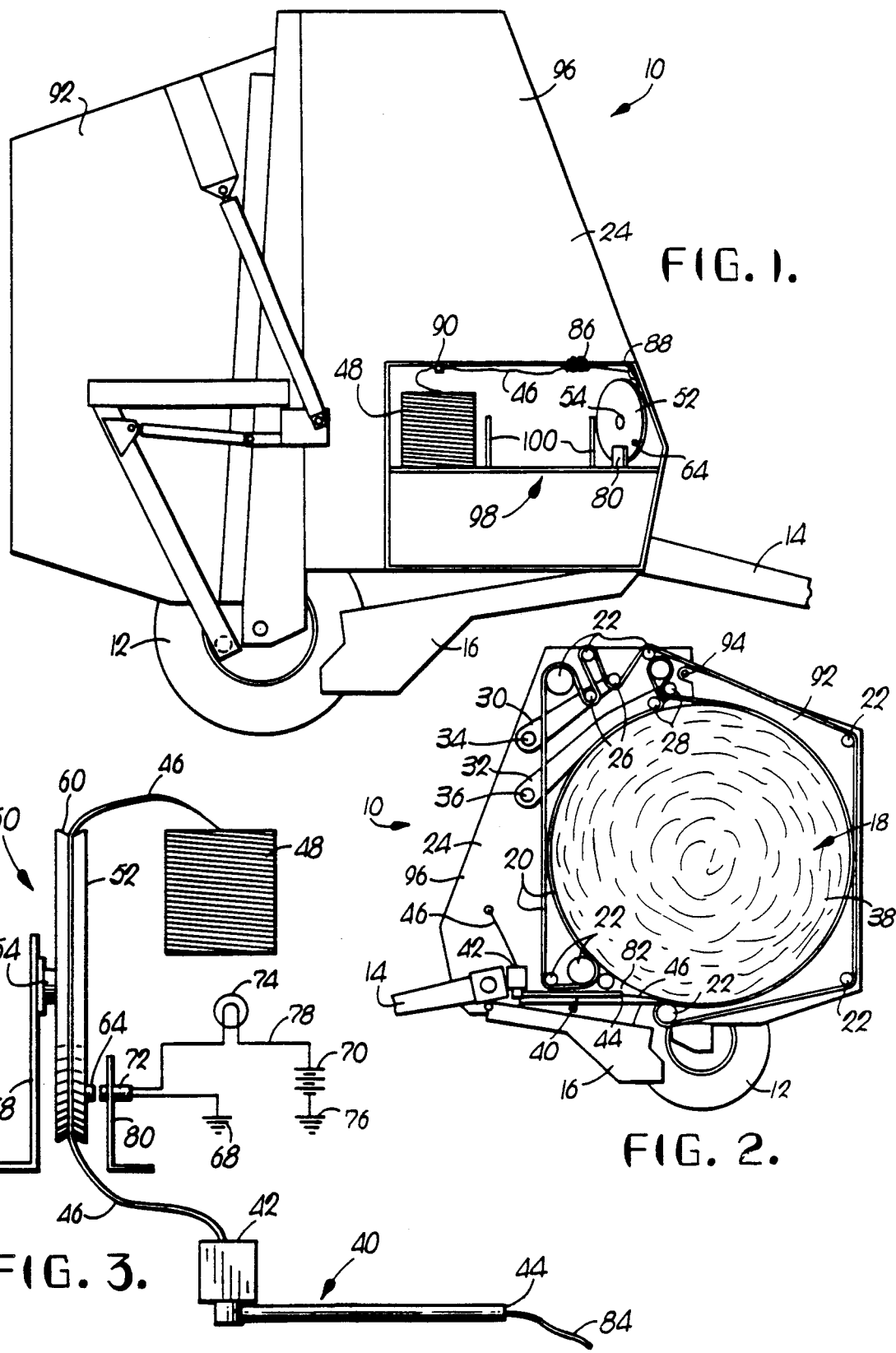

TWINE MONITORING ASSEMBLY FOR ROUND BALERS

This application is a continuation; of application Ser. No. 384,847, filed July 17, 1989 (now abandoned) which is a continuation of application Ser. No. 07/102,026 filed Sept. 29, 1987 (now abandoned).

BACKGROUND OF THE INVENTION

1. Field of the Invention

This invention relates to round balers, and more particularly, to a twine monitoring assembly used to indicate to the baler operator that twine is properly being dispensed during wrapping of a bale.

2. Background of the Prior Art

Round balers utilize various devices for wrapping completed bales with twine, for example, a twine tube has been used in the past which moves along the length of the bale, dispensing twine thereto, as the bale rotates thereby wrapping the entire length of the bale. The wrapping devices employed and the twine used for wrapping the bale are usually located either within or beneath the baler structure and as such, are usually not easily viewed by the operator. As a consequence, when operating the baler, it is not easy for the operator to determine if twine is being properly dispensed during the wrapping operation, and likewise, it is not easy for the operator to determine if twine is not being dispensed, as is proper, during either bale formation or following bale wrapping operations.

Consequently, a need exists for a device in round balers which will indicate to the operator whether or not twine is being dispensed.

SUMMARY OF THE INVENTION

Accordingly, the present invention provides a twine monitoring assembly for round balers designed to solve the problems outlined above. The monitor hereof includes a rotatable monitor wheel having its periphery wrapped once with the twine to be dispensed and further includes an electronic circuit comprising a power source, a normally biased open, magnetically operated switch, and an indicator light. As twine is being dispensed, the twine rotationally drives the monitor wheel thereby causing a magnet, affixed to a side of the wheel, to move through a circular path of travel, passing the magnet by the switch during each revolution of the wheel, thereby closing the switch for a brief period of time and causing the indicator light to pulsate as the wheel rotates. The pulsating light indicates to the operator that twine is being dispensed. When the wheel stops rotating, the light will stop pulsating thereby indicating to the operator that twine is no longer being dispensed.

BRIEF DESCRIPTION OF THE DRAWINGS

FIG. 1 is a side elevational view of a baler incorporating a twine dispensing monitor in accordance with the present invention, a storage compartment being open to reveal a supply roll and a monitor wheel;

FIG. 2 is a vertical side elevational view of the baler having the nearest sidewall removed to reveal a completely formed bale being wrapped with twine; and FIG. 3 is a schematic view of the monitor assembly, twine supply roll and twine dispensing tube.

DETAILED DESCRIPTION

Referring now to FIGS. 1 and 2, the baler 10 is provided with ground wheels 12, a fore-and-aft extending tongue 14 adapted at its forwardmost end for attaching to a towing vehicle (not shown), pickup 16 for lifting windrowed crop material off the ground as the baler 10 advances over the ground, a baling chamber 18 defined by a series of endless, side-by-side belts 20 (only one belt depicted) trained about rollers 22 extending between a pair of spaced-apart, chamber defining sidewalls 24 (only one being shown). Tensioning rollers 26, 28 extend between respective arm pairs 30, 32 (only one arm of each pair is shown in the drawings) that are swingably attached to respective sidewalls 24 about aligned pivots 34, 36 (only one pivot of each arm pair being shown). Tensioning means (not shown) yieldably bias the arm pairs 30, 32 downwardly thereby keeping the belts 20 taut. A bale 38 is depicted in FIG. 2 formed in chamber 18, and having a longitudinal axis extending between the baler sidewalls 24.

As illustrated in FIGS. 2 and 3, a dispensing tube 40 for applying twine to bale 38 is mounted forwardly of the bale 38 and has a twine receiving end 42 and a twine dispensing end 44. During wrapping of the bale 38, a strand of twine 46 is drawn from a supply roll 48 and pulled through dispensing tube 40 by the rotating bale.

A twine monitor assembly 50, depicted in FIG. 3, is in contact with the strand 46 intermediate the supply roll 48 and tube 40 for generating a pulsating signal in response to twine being dispensed. Assembly 50 includes a monitor wheel 52 rotatably mounted at its center on stub shaft 54 which extends from and is secured to frame element 58. The periphery of wheel 52 is defined by a V-shaped groove 60 which receives one wrap of strand 46. The V-shaped configuration prevents the wrap of strand 46 from sliding sideways off of the wheel periphery. A magnet 64 is affixed to a side of the wheel at a location radially outward from the central axis of rotation 54 of wheel 52 and during rotation of the wheel 52 follows a generally circular path of travel about axis 54.

Assembly 50 further includes an electrical circuit 66 comprising a grounded terminal 68, a magnetically operated, normally biased open switch 72, an electrically actuated indicator light 74, a 12-volt battery 70, a second grounded terminal 76, and circuitry wire 78 interconnecting the aforementioned circuit components. The switch 72 is mounted on a frame piece 80 at a location adjacent the side of wheel 52 and adjacent the circular path of travel of the magnet 64 for closure thereby during each rotation of the wheel 52. Preferably, the indicator light 74 is located in the cab of the towing vehicle (not shown) for easy viewing by the operator.

In use, the twine tube 40 is in its standby position outboard of sidewall 24 throughout the time the bale 38 is forming within the chamber 18. Once the bale 38 is fully formed, the dispensing end 44 of twine tube 40 is shifted from its standby position to a position adjacent the bale 38 and crop inlet 82. A portion of twine 84 dangles from the dispensing end 44 of tube 40 as depicted in FIG. 3.

Once the twine tube 40 has moved sufficiently inboard of the sidewalls 24, the dangling end of twine 84 will be caught up in new crop material delivered to the chamber 18 by the pickup 16. Wrapping of the bale will then commence as the rotating bale 38 pulls the twine 46 from the tube 40 while the dispensing end 44 of the tube 40 is moved along the length of the bale 38. As the strand 46 is pulled, it drives the wheel 52 through numerous rotations moving the magnet 64 through its circular path of travel, briefly bringing the magnet 64 closely adjacent to the switch 72, closing the switch 72 and completing the circuit 66 and energizing the light 74 for a brief period of time during each rotation. As the wheel 52 rotates, the light 74 will pulsate indicating to the operator that twine is being dispensed. The rate that the light 74 pulsates is directly related to the rate that twine is being dispensed (i.e., the faster the twine is dispensed, the faster the light will pulsate).

Once wrapping is initiated, the operator will normally terminate further advancement of the baler 10 over the ground at this time such that no new material is picked up, although the belts 20 will continue to be operated so that the bale 38 continues to spin within the chamber 18. Twine 46 is thereby coiled helically around and along the length of the bale 38 as the dispensing end 44 of the tube 40 moves between the baler sidewalls 24 and along the length of the bale 38. The operator will observe the indicator light 74 to determine whether or not twine is being dispensed to the bale. During initiation of the wrapping operation, pulsating of the light 74 will indicate to the operator that the loose end 84 was picked up in the new crop material and imbedded therein. Continued pulsating of the light 74 will indicate to the operator that twine is being properly dispensed during wrapping of the bale 38 as the dispensing end 44 of the tube 40 moves along the length of the bale and dispenses twine thereto. Upon completion of the wrapping operation, the baler 10 will sever the strand 46 by means not shown, thereby forming a new loose end 84 and preventing the wrapped bale from pulling any additional twine from the twine supply 48. If no additional twine is being dispensed, a tensioner 86 gripping strand 46 intermediate wheel 52 and supply roll 48 gently resists the pulling of strand 46 therefrom, applying a braking force to wheel 52 and preventing the latter from free-wheeling following the wrapping. Once the twine 46 has been successfully severed, and rotation of the wheel 52 has been brought to a stop, the light will no longer pulsate. As illustrated in FIG. 2, the path followed by the twine 46 from the supply roll 48 to the wheel 52 is determined by an eyelet 88 which is mounted above wheel 52 and which guides strand 46 onto the grooved periphery thereof, and by an eyelet 90 which is mounted above supply roll 48 for guiding twine therefrom to tensioner 86.

Once the bale is completely formed and has been completely wrapped, the bale is discharged by raising rear baler portion 92 upwardly and rearwardly about the aligned pivots 94 (only one being shown) which interconnect the rear baler portion 92 with frame mounted, rigid, front baler portion 96.

A compartment 98 is mounted on and extends outwardly from sidewall 24, and is divided into three subcompartments by partitions 100, one subcompartment containing the supply roll 48, and another subcompartment containing the wheel 52 and switch 72.

As an alternative arrangement, the present invention contemplates eliminating the battery 70 from the circuit 66 and replacing the switch 72 with a copper coil having one end connected to a circuit wire leading from ground 68 and another end connected to a circuit wiring leading to light 74. This alternative arrangement also includes a plurality of spaced magnets 64 affixed to a side of the wheel 52 at equal distances radially outward from the central axis of rotation 54 of wheel 52. The magnets, during rotation of the wheel 52, follow a common circular path of travel about the axis 54. In operation of this alternative arrangement, rotation of the wheel 52 brings successive magnets past the coil, causing the magnetic fields of the magnets 64 to pass through the coil thereby generating successive pulses of electrical current within the circuit and causing the light 74 to pulsate as the wheel rotates.

We claim:

1. In a round baler having a baling chamber for spinning a cylindrical bale of fibrous crop material about its longitudinal axis during and after formation thereof, said baler including means for wrapping said bale with a strand of twine from a twine supply prior to discharge of said bale from said chamber, said wrapping means including a twine dispenser having a dispensing end movable along the longitudinal length of the bale for dispensing twine thereto by increments during each twine dispensing cycle, the improvement comprising a twine monitor assembly for monitoring the dispensing of said twine, said twine monitor assembly including:
   an electrically powered indicator which is repeatedly actuatable during each dispensing cycle;
   sensing means continuously monitoring the twine during each dispensing cycle for sensing each predetermined increment of twine being dispensed from the twine dispenser; and
   indicator actuating means for repeatedly turning the indicator on and off during each dispensing cycle in response to the sensing means sensing dispensing of said predetermined increments of twine, the speed at which the indicator repeatedly turns on and off providing an indication that twine is being dispensed and of the speed at which the twine is being dispensed.

2. The baler as claimed in claim 1, said assembly being in contact with said strand intermediate said supply and said dispenser.

3. In a round baler having a baling chamber for spinning a cylindrical bale of fibrous crop material about its longitudinal axis during and after formation thereof, said baler including means for wrapping said bale with a strand of twine from a twine supply prior to discharge of said bale from said chamber, said wrapping means including a twine dispenser having a dispensing end movable along the longitudinal length of the bale for dispensing twine thereto, the improvement comprising a twine monitor assembly for monitoring the dispensing of said twine, said twine monitor assembly including:
   a monitor wheel having a central axis of rotation, said strand being wrapped about the periphery of said wheel for rotationally driving said wheel about said central axis as the strand is being dispensed;
   an electrical circuit having in electrically interconnected relationship a power source, a switch and an electrically actuated indicator for receiving power from said source when the switch is closed whereby to produce a signal, said switch being normally biased open for non-actuation of said indicator, said switch being positioned adjacent said wheel; and
   means affixed to said wheel radially outward from said central axis for briefly closing said switch and actuating said indicator during each rotation of said wheel for providing an indication that twine is being dispensed and for providing an indication of the speed at which the twine is being dispensed.

4. The baler as claimed in claim 3, said switch being magnetically operated, said closing means being a magnet.

5. The baler as claimed in claim 4, said indicator being a light bulb.

6. In a round baler having a baling chamber for spinning a cylindrical bale of fibrous crop material about its longitudinal axis during and after formation thereof, said baler including means for wrapping said bale with a strand of twine from a twine supply prior to discharge of said bale from said chamber, said wrapping means including a twine dispenser having a dispensing end movable along the longitudinal length of the bale for dispensing twine thereto, the improvement comprising:

an electrical circuit including in electrically interconnected relationship a power source, a normally biased open switch which is openable and closable at a variable speed, and an electronically actuated indicator for receiving power from said source when the switch is closed, whereby to produce a signal; and means for opening and closing said switch repeatedly during the dispensing of said twine to repeatedly actuate the indicator, the speed at which said switch opens and closes being dependent upon the speed at which said twine is being dispensed.

7. The baler as claimed in claim 6, said indicator being a light bulb.

8. The baler as claimed in claim 6, said closing means including a monitor wheel having a central axis of rotation, said strand being wrapped about the periphery of said wheel for rotationally driving said wheel about said central axis as the strand is being dispensed, said switch being magnetically actuatable, said closing means including a magnet affixed to said wheel radially outward from said central axis and movable through a generally circular path of travel as said wheel is rotated, said switch being located adjacent said circular path of travel for being closed by said wheel thereby actuating said indicator during the rotation of said wheel.

9. In a round baler having a baling chamber for spinning a cylindrical bale of fibrous crop material about its longitudinal axis during and after formation thereof, said baler including means for wrapping said bale with a strand of twine from a twine supply prior to discharge of said bale from said chamber, said wrapping means including a twine dispenser having a dispensing end movable along the longitudinal length of the bale for dispensing twine thereto, the improvement comprising;

an electrical circuit including in electrically interconnected relationship a power source, a normally biased open switch, and an electronically actuated indicator for receiving power from the source when the switch is closed whereby to actuate the indicator; and means for opening and closing said switch repeatedly during the dispensing of said twine to repeatedly actuate the indicator to provide a flashing indication of a twine dispensing condition.

* * * * *